United States Patent
Drubel et al.

(10) Patent No.: US 7,489,058 B2
(45) Date of Patent: Feb. 10, 2009

(54) CONNECTION ARRANGEMENT FOR THE STATOR WINDING OF A TURBO MACHINE HAVING TWO OR MORE PARALLEL CIRCUITS

(75) Inventors: Oliver Drubel, Pegnitz (DE); Kevin Mayor, Gebenstorf (CH); Francesco Stallone, Locarno (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/624,728

(22) Filed: Jan. 19, 2007

(65) Prior Publication Data

US 2007/0188030 A1    Aug. 16, 2007

(30) Foreign Application Priority Data

Jan. 24, 2006    (CH) ................................. 00110/06

(51) Int. Cl.
    *H02K 11/00*    (2006.01)
(52) U.S. Cl. .......................................... 310/71; 310/179
(58) Field of Classification Search ................... 310/71, 310/179
    See application file for complete search history.

(56) References Cited

U.S. PATENT DOCUMENTS

| 5,099,159 | A | * | 3/1992 | Liptak et al. ................... 310/45 |
| 5,828,147 | A | * | 10/1998 | Best et al. ...................... 310/71 |
| 5,900,687 | A | * | 5/1999 | Kondo et al. ................... 310/71 |
| 6,369,473 | B1 | * | 4/2002 | Baumeister et al. ............ 310/71 |
| 6,600,244 | B2 | * | 7/2003 | Okazaki et al. ................ 310/71 |
| 6,914,356 | B2 | * | 7/2005 | Yamamura et al. ............ 310/71 |
| 6,919,664 | B2 | * | 7/2005 | Leijon et al. .................. 310/196 |

(Continued)

FOREIGN PATENT DOCUMENTS

EP    0375419    6/1990

(Continued)

OTHER PUBLICATIONS

Lari, R. et al., "THR-L63, an Advanced Generator Coupled Front and Back to Gas and Steam Turbine for Single Shaft Configuration," PowerGen Europe, May 6-8, 2003, pp. 1-19, Dusseldorf, Germany.

(Continued)

*Primary Examiner*—Burton Mullins
*Assistant Examiner*—Alex W Mok
(74) *Attorney, Agent, or Firm*—Cermak Kenealy Vaidya & Nakajima LLP; Adam J. Cermak

(57) ABSTRACT

In a connection arrangement (10) for the stator winding of a turbo machine with two or more parallel circuits of individual conductors (26, 29) per phase, the individual conductors belonging to one phase form a phase group (25, 28) and run directly adjacent to one another in the stator body, the individual conductors of the winding are each connected from a winding connection (21, ..., 24) to an external connection (15, ..., 20) via a phase ring (32), which runs concentrically with respect to the machine axis (33).

A simplification of the manufacture and assembly as well as a reduction in space requirements and an improvement in the thermal properties are achieved by the phase rings (32) of a phase group each being led together as a phase ring group (11, ..., 14) from the winding connections (21, ..., 24) to the external connections (15, ..., 20).

5 Claims, 2 Drawing Sheets

U.S. PATENT DOCUMENTS

| | | | | |
|---|---|---|---|---|
| 2002/0057067 | A1* | 5/2002 | Steinbrink | 318/135 |
| 2004/0066103 | A1* | 4/2004 | Ohuchi et al. | 310/71 |
| 2004/0070293 | A1* | 4/2004 | Kabasawa et al. | 310/71 |
| 2004/0108784 | A1* | 6/2004 | Higashino et al. | 310/179 |
| 2004/0145257 | A1* | 7/2004 | Oohashi | 310/71 |
| 2005/0253466 | A1* | 11/2005 | Seguchi et al. | 310/71 |

OTHER PUBLICATIONS

Lari, R. et al., "THR-L63, an Advanced Generator Coupled Front and Back to Gas and Steam Turbine for Single Shaft Configuration," PowerGen Europe, May 5, 2003, pp. 35-45, Dusseldorf, Germany.

Nagano, S., et al., "Development of world's largest hydrogen-cooled turbine generator," Power Engineering Society Summer Meeting, Jul. 2002, Proceedings vol. 2, pp. 657-663, Yokohama, Japan.

Search Report for Swiss Patent App. No. CH 0110/2006 (May 24, 2006).

* cited by examiner

CONNECTION ARRANGEMENT FOR THE STATOR WINDING OF A TURBO MACHINE HAVING TWO OR MORE PARALLEL CIRCUITS

This application claims priority under 35 U.S.C. § 119 to Swiss application number 00110/06, filed 24 Jan. 2006, the entirety of which is incorporated by reference herein.

BACKGROUND OF THE INVENTION

1. Field of the Invention

The present invention relates to the field of electrical machines. It relates to a connection arrangement for the stator winding of a turbo machine with two or more parallel circuits.

2. Brief Description of the Related Art

There are numerous schemes in which the connections are led from the stator winding of an electrical machine to the machine or generator housing in order to be connected there to the busbars. In general, the connecting conductors are in this case led from the phase connection location, i.e., from the ends of the winding bars protruding out of the slots of the stator body, along the rear side of the evolute of the stator end winding up to external connections arranged on a circumferential circle.

The arrangement used depends on the winding scheme, in particular on the number of phases, the number of poles and the number of circuits per phase. In general, the various phase connecting conductors are arranged such that the sum of the currents of all phase rings at any desired circumferential location is limited to a specific value in order to avoid imbalances in the magnetomotive force (MMF) resulting from the currents in the phase rings. In general, such connecting rings (phase rings) are insulated individually and laid individually according to the physical and electrical boundary conditions.

The article by Nagano S, Kitajima T, Yoshida K, Kazao Y, Murata D, Nagakura K., "Development of world's largest hydrogen-cooled turbine generator", PES Summer Meeting July 2002, Proceedings volume 2, pages 657-663 describes the construction and testing of a hydrogen-cooled 500-600 MVA generator. FIG. 15(b) therein illustrates the phase ring connections and shows that the winding has three phases, of which each has three parallel circuits, all six external connections being arranged on the base of the machine. The three parallel circuits are arranged such that they run together in adjacent stator slots within a phase group. However, the phase rings which connect them to the external connections are insulated individually and led individually to a suitable external connection.

The article by R. Lari and V. Tartaglione, "THR-L63, An Advanced Generator coupled front and back to gas and steam turbine for single shaft configuration", PowerGen Europe, Dusseldorf 6-8 May 2003, describes the construction of a hydrogen-cooled 400 MW generator. The diagram shown therein on page 11 of the end winding supports shows that the winding likewise has three phases, which each have three parallel circuits, and three external connections on the base and three external connections on the upper side of the machine. The three parallel circuits are arranged such that they run together in adjacent slots of the stator within a phase group. However, here too, the phase rings which they connect to the external connections are insulated individually and led individually to a suitable external connection.

The known technique of individually leading the phase ring connections means that each ring needs to be insulated from the full voltage between two phases and mounted and installed individually. This results in impaired thermal properties of the connecting conductors and an increased space requirement owing to the thicker bar insulation and/or owing to the increased distance between the bars. Also, the need to manufacture and install individual bars results in the manufacture and assembly of the winding being time-consuming and expensive. This is particularly the case when each phase has more than two parallel circuits.

SUMMARY OF THE INVENTION

One of numerous aspects of the present invention includes providing a connection arrangement for the stator winding of a turbo machine with two or more parallel circuits, which is characterized by reduced manufacturing and assembly complexity and requires less space in the machine.

Another advantageous aspect of the present invention includes that the phase rings of a phase group within the connection arrangement are each led systematically together as a phase ring group from the winding connections to the external connections. This avoids a situation in which all of the phase rings need to be designed individually in terms of the insulation for the maximum voltage between two phases with the negative consequences outlined above.

One exemplary configuration in accordance with the present invention includes individual conductors of a phase group run separately from one another in adjacent slots of the stator body.

Another exemplary configuration in accordance with the present invention includes individual conductors of a phase group being assembled in a manner in which they are insulated from one another, to form a unit provided with common outer insulation.

In particular, the individual conductors for their part may include individual conductor elements.

Yet another exemplary configuration in accordance with the present invention includes adjacent phase rings of two adjacent phase ring groups having a first distance from one another, the phase rings of a phase ring group having a second distance from one another, and the second distance is markedly smaller than the first distance.

BRIEF DESCRIPTION OF THE DRAWINGS

The invention will be explained in more detail below with reference to exemplary embodiments in connection with the drawing, in which.

DETAILED DESCRIPTION OF EXEMPLARY EMBODIMENTS

Figure 1:
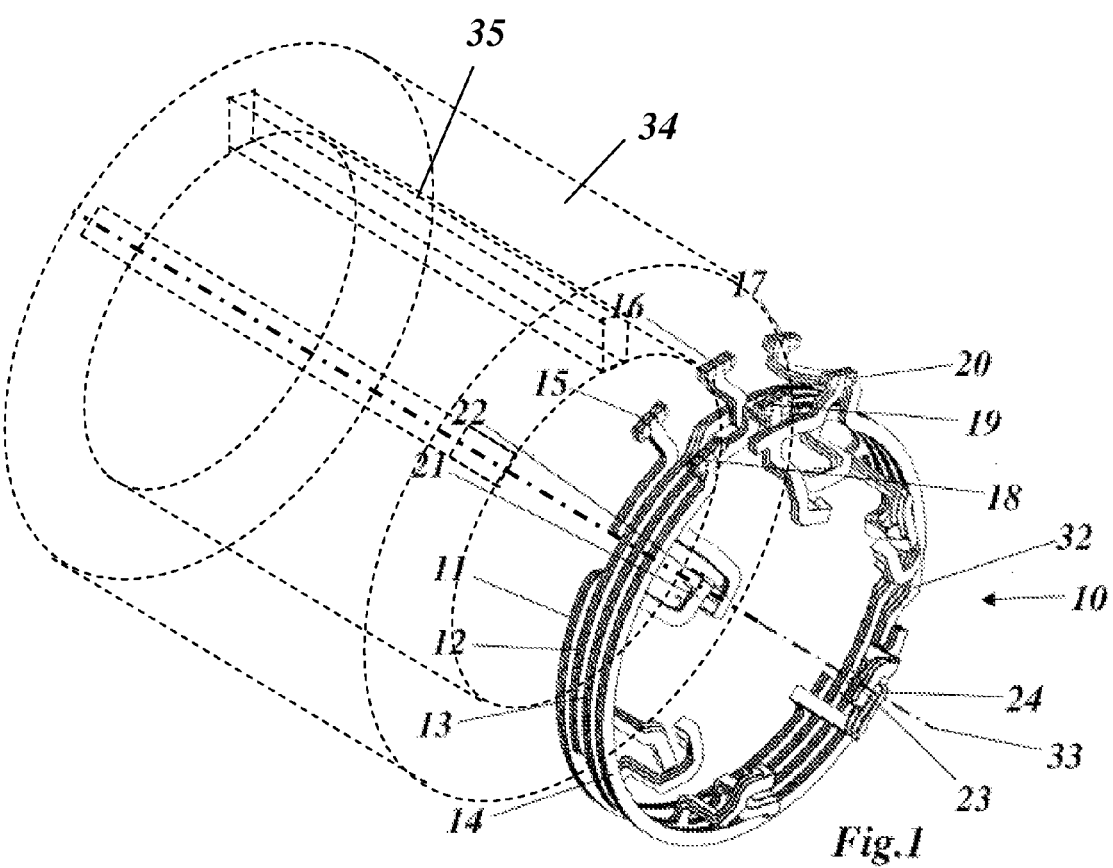
FIG. 1 shows a perspective illustration of an exemplary embodiment of a connection arrangement according to the invention in a stator winding with three phases and three circuits per phase and external connections arranged on the upper side of the machine.
Figure 2:
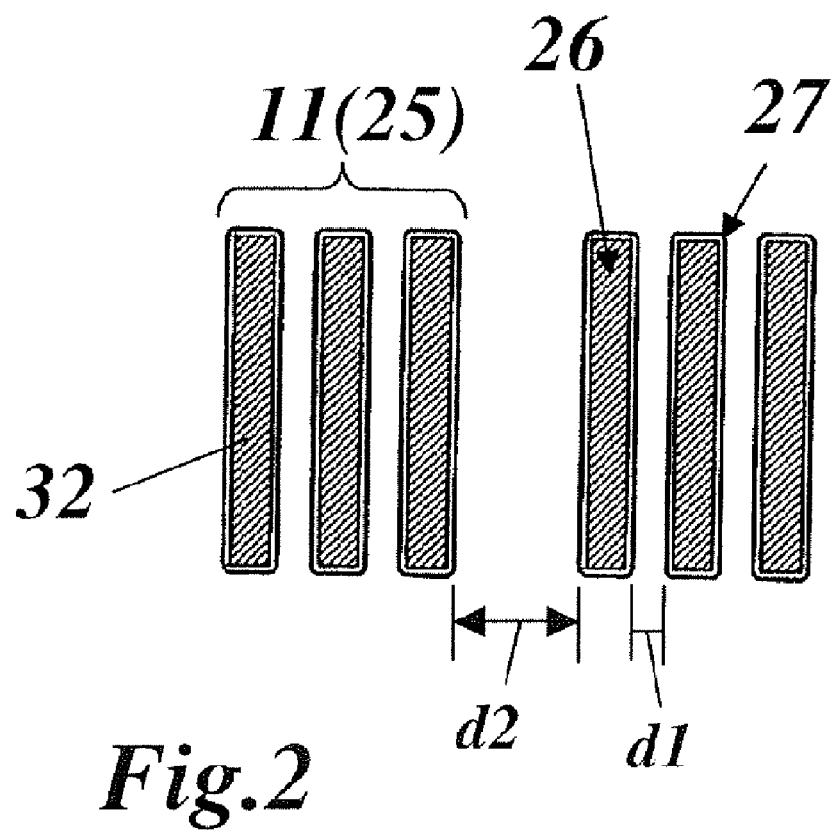
FIG. 2 shows the configuration of the individual conductors within the phase groups or phase ring groups in the case of separate individual conductors.

FIG. 1 reproduces a perspective illustration of an exemplary embodiment of a connection arrangement according to the invention. The stator itself, the stator winding, and the machine housing are not illustrated for reasons of clarity. The connection arrangement 10 is designed for three phases, which each have three parallel circuits. The external connections 15, 16, 17 and 18, 19, 20, which are arranged on the upper side of the machine, belong to the three phases. The winding, which is led parallel to the machine axis 33 through the stator body 34 in the stator slots 35, is connected to the connection arrangement 10 at a large number of winding connections. Of the winding connections, only the winding connections of one phase are provided with the reference symbols 21, . . . , 24, in a representative manner. In the example in FIG. 1, in each case three parallel winding circuits are provided per phase, whose (three) individual conductors 26—as shown in FIG. 2—run next to one another in phase groups 25 and are accommodated in adjacent stator slots 35. Accordingly, in each case three adjacent connections are provided at the winding connections 21, . . . , 24 in FIG. 1. Each of the individual conductors 26 is connected in the winding connections 21, . . . , 24 to the associated external connection 15, . . . , 20 by means of a phase ring 32, which is arranged concentrically with respect to the machine axis 33.

An advantageous aspect of the invention includes the systematic (ordered) leading of these phase rings 32, which are associated with a certain phase, together as a phase ring group 11, . . . , 14 from the winding connections 21, . . . , 24 to the external connections 15, . . . , 20, as is shown in FIG. 1. This results in a plurality of phase ring groups 11, . . . , 14 each with three parallel phase rings 32 with corresponding individual conductors 26. This arrangement means that adjacent phase rings 32 of two adjacent phase ring groups 11, . . . , 14, as shown in FIG. 2, have a first distance d2 from one another, that the phase rings 32 of a phase ring group 11, . . . , 14 have a second distance d1 from one another, and that the second distance d1 may be selected to be markedly smaller than the first distance d2 owing to the lower requirements placed on the dielectric strength. This also means that the insulation thickness of the conductor insulation (27 in FIG. 2) of each individual conductor (bar) 26 within the phase group 25 or phase ring group 11 can be reduced, as a result of which the thermal properties are improved and the manufacturing costs are reduced and, at the same time, a more compact arrangement of the conductors is made possible. An additional advantage is that the phase rings 32 can be manufactured and assembled in phase groups 25, as a result of which the time for the in-plant assembly and subsequent packaging and fixing can be markedly reduced.

Figure 3:
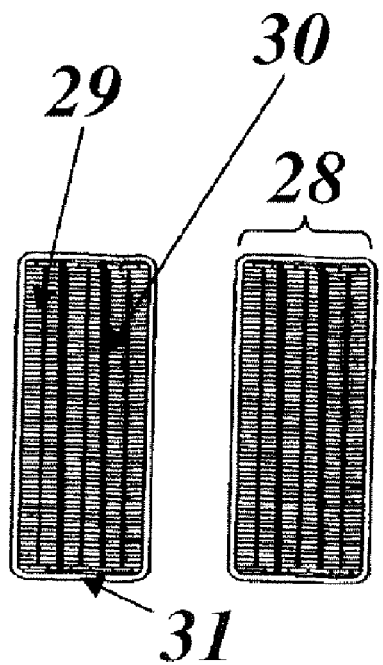
FIG. 3 shows the configuration of the individual conductors within the phase groups or phase ring groups in the case of individual conductors assembled to form a unit.

FIG. 1 shows the proposed phase ring arrangement for a phase connection with three phases, three parallel circuits per phase, and with the external connections 15, . . . , 20 on the upper side (or on the base) of the machine. The three individual conductors 26 are led systematically together as a group from the stator winding to the external connection. Similar arrangements are possible for any desired locations of the external connections, for example with three connections at the top and three connections at the bottom. The individual conductors can in this case either have a solid Cu cross section (FIG. 2) or themselves include a plurality of individual conductor elements, which can be transposed (Roebel bar) in order to reduce circulating current losses (FIG. 3). In addition, the individual conductors within a phase group 28 can be manufactured as a complete unit, an intermediate insulation 30 being provided between the individual conductors 29 and an outer insulation 31 being provided around the conductor group (FIG. 3).

Principles of the present invention can be applied to any desired stator windings with two or more circuits, whose windings are accommodated in adjacent slots, and can be applied to phase sequences which rotate in the same direction as or in the opposite direction to the direction of rotation of the rotor.

LIST OF REFERENCE SYMBOLS

| | |
|---|---|
| 10 | Connection arrangement |
| 11, . . . , 14 | Phase ring group |
| 15, . . . , 20 | External connection |
| 21, . . . , 24 | Winding connection |
| 25, 28 | Phase group |
| 26, 29 | Individual conductor |
| 27 | Conductor insulation |
| 30 | Intermediate insulation |
| 31 | Outer insulation |
| 32 | Phase ring |
| 33 | Machine axis |
| d1, d2 | Distance |
| Stator body | |
| Slot | |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A connection arrangement for the stator winding of a turbo machine with two or more phases and phase windings with two or more parallel circuits of individual conductors per phase, and, for each phase, a first external connection configured and arranged to be connected to a winding start of said phase winding, and a second external connection configured and arranged to be connected to a winding end of said phase winding, the connection arrangement comprising:

individual conductors belonging to each phase forming a first phase group configured and arranged to be connected to said first external connection, and a second phase group configured and arranged to be connected to said second external connection, said individual conductors of each phase group running directly adjacent and parallel to one another when in the stator body;

phase rings running concentrically with respect to the machine axis and connecting each of said individual conductors of one of said phase groups to the respective external connections of said phase; and wherein the phase rings of each of said phase groups are each led together as a phase ring group of parallel phase rings from the winding connections to the external connections.

2. The connection arrangement as claimed in claim 1, further comprising:

a stator body including adjacent slots;

wherein the individual conductors of a phase group run separately from one another in adjacent slots of the stator body.

3. The connection arrangement as claimed in claim 1, wherein the individual conductors of a phase group are assembled and insulated from one another to form a unit with common outer insulation.

4. The connection arrangement as claimed in claim 1, wherein the individual conductors each comprise individual conductor elements.

5. The connection arrangement as claimed in claim 1, wherein adjacent phase rings of two adjacent phase ring groups define a first distance (d2) from one another, wherein the phase rings of a phase ring group have a second distance (d1) from one another, and wherein the second distance is smaller than the first distance.

\* \* \* \* \*